United States Patent
Dattler et al.

(10) Patent No.: US 8,005,614 B2
(45) Date of Patent: Aug. 23, 2011

(54) METHOD FOR MONITORING THE INTEGRITY OF AN AIRCRAFT POSITION COMPUTED ON BOARD

(75) Inventors: Stéphane Dattler, Montlaur (FR); Vincent Markiton, Fontenilles (FR)

(73) Assignee: Airbus France, Toulouse (FR)

( * ) Notice: Subject to any disclaimer, the term of this patent is extended or adjusted under 35 U.S.C. 154(b) by 1032 days.

(21) Appl. No.: 11/841,061

(22) Filed: Aug. 20, 2007

(65) Prior Publication Data
US 2008/0046141 A1 Feb. 21, 2008

(30) Foreign Application Priority Data

Aug. 21, 2006 (FR) ..................... 06 53415

(51) Int. Cl.
*G01M 17/00* (2006.01)
*G08G 5/02* (2006.01)
*G06F 19/00* (2006.01)
(52) U.S. Cl. ............. 701/209; 701/3; 701/214; 244/194
(58) Field of Classification Search ............ 701/29, 701/209, 214, 213, 3; 342/357.29, 120, 357.58, 342/122; 244/194
See application file for complete search history.

(56) References Cited

U.S. PATENT DOCUMENTS

| 6,377,892 B1 * | 4/2002 | Johnson et al. | 701/213 |
| 6,668,640 B1 * | 12/2003 | Alwin et al. | 73/170.02 |
| 6,864,836 B1 * | 3/2005 | Hatch et al. | 342/357.58 |
| 7,436,354 B2 * | 10/2008 | Lee | 342/357.29 |

FOREIGN PATENT DOCUMENTS

| EP | 0 678 841 A1 | 10/1995 |
| EP | 1 679 567 A2 | 7/2006 |

\* cited by examiner

*Primary Examiner* — Tan Q Nguyen
(74) *Attorney, Agent, or Firm* — Perman & Green, LLP

(57) ABSTRACT

A method for monitoring the integrity of an aircraft position computed on board including on-board means for monitoring the aircraft position that are able to detect common-mode failures. Dissimilar computing channels of the aircraft position are utilized, the dissimilar channels being on-board in the aircraft. Each aircraft position primary computing channel is supplemented by a dissimilar computing channel, which allows the coherence of the primary aircraft position, the position computed by the primary computing channels, to be verified. Mechanisms for verifying the reliability of the results from dissimilar computing channels are implemented to limit a loss of performance from the utilization of dissimilar computing channels, which are less performing than primary computing channels.

16 Claims, 2 Drawing Sheets

METHOD FOR MONITORING THE INTEGRITY OF AN AIRCRAFT POSITION COMPUTED ON BOARD

TECHNICAL FIELD

The disclosed embodiments are directed to a method for monitoring the integrity of an aircraft position computed on board, aircraft position computed on board refers to a set of values relative to the position of the aircraft in space, obtained by on-board measuring and computing means within the aircraft considered; the set of values most often corresponds to three values respectively representing the longitude, latitude and altitude of the aircraft. Advantageously, the disclosed embodiments are implemented to safeguard the aircraft from errors in computing the aircraft position, which would lead to an impact with the ground.

In general, the field of the disclosed embodiments is that of aircraft position computing. The disclosed embodiments propose a solution to verify the integrity of the aircraft position in the context of exploiting such a position in particular applications, referred to as critical applications, intervening in difficult piloting operations such as:

stand-alone approaches, which correspond to landing procedures in which only the onboard measuring and computing means in the aircraft are available, the ground control methods not being available;

low-altitude flights, where the ground control methods are also no longer available;

any other piloting operation where the ground control methods are no longer operable.

usually, the aircraft position is computed by primary conventional position computing means and monitored by various dissimilar conventional position monitoring means. Dissimilar means refers to means of a different nature from primary means, bringing different parameters and/or computing channels and/or electronic circuits into play, for determining the same parameter, the aircraft position in the present case.

A primary conventional aircraft position computing means, which is referred to as an on-board means, resides in the on-board computing means, which essentially use a GPS (Global Positioning System) sensor and an inertial navigation system, which allows the aircraft, by means of gyroscopes, accelerometers and a computer, to know its position and speed in space.

A first conventional monitoring means, which is a means referred to as ground support, resides in air control, where different pieces of information are exchanged between, typically, a control tower and the pilots of the aircraft considered.

A second conventional monitoring means, which is also referred to as ground support, resides in the utilization of special means, referred to as ground facilities, known under the initials ILS (Instrument Landing System), utilized as a landing aid, particularly when visibility is reduced. ILS brings different pieces of equipment into play, which exchange information with the on-board equipment in the aircraft; three main elements are found in the ILS, which are:

a locator, comprised of a set of antennas situated after the end of the runway, which provides information relative to the distance of the aircraft with relation to the runway center line;

a glide parameter, which provides the distance of the aircraft with relation to the approach slope;

distance measuring equipment, known under the initials ATI DME, which provides information relative to distance with relation to the landing runway threshold.

TECHNOLOGICAL BACKGROUND

In the prior art, on-board aircraft monitoring means bring a computer implementing several, typically three, redundant computing channels into play, as shown in FIG. 1. Two computing channels are called redundant when the channels are comprised of the same hardware and software elements. Thus, the channels are theoretically identical and, still theoretically, should provide identical results. The utilization of three redundant computing channels ensures adequate processing of the drift from one of the computing channels.

Thus, as illustrated in FIG. 1, a first computing channel 101, a second computing channel 102 and a third computing channel 103 are schematically represented. The channels are referred to as primary computing channels since they are the computing channels present in computers from the prior art. The channels are also routinely called critical computing channels, where the term "critical" refers to the position since position is used for critical applications. The three primary computing channels are redundant. All the channels simultaneously produce primary computing cycles that each result in obtaining a primary three-dimensional position of the aircraft, respectively referred to as 3D Position No. 1, 3D Position No. 2, and 3D Position No. 3. These three primary positions, obtained simultaneously, are then sent to a computer 104 whose role is to consolidate the results provided by the primary computing channels. Therefore, if one of the three primary positions is completely incoherent with relation to the two others, it is not taken into consideration in the development of a consolidated aircraft position 105 that will subsequently be used, particularly in critical applications.

However, such an organization does not allow the organization alone to manage the onset of common-mode failures. Such failures generally affect mainly most, if not all, redundant aircraft position computing channels. These breakdowns may, for example, have at their origin coding errors, a breakdown of a hardware component intervening in the redundant computing channels, external circumstances such as lightning, a GPS receiver common-mode failure or a problem known as multipath GPS, in which the GPS signal is reflected on the ground before returning to the aircraft sensors.

Therefore, a common-mode failure results, in most cases, in three incoherent results and comparable values being obtained, none of which may then be distinguished and no error may be detected. Consequently, during difficult piloting operations such as stand-alone approaches or low-altitude flights, during which the dissimilar conventional aircraft position monitoring means are no longer available, no common-mode failure detection means exist.

SUMMARY

A general problem that the disclosed embodiments seek to resolve is thus to verify the integrity of the aircraft position with regard to failures known as common-mode failures, to organize the detection of common-mode failures during critical piloting operations during which dissimilar conventional monitoring means are no longer available.

In one aspect, the disclosed embodiments propose a solution to the problems and disadvantages that have just been disclosed. Generally, the disclosed embodiments propose the introduction of on-board means for monitoring the aircraft position that are able to detect common-mode failures. For this purpose, the disclosed embodiments propose utilizing dissimilar aircraft position computing channels, said dissimilar channels being on-board in the aircraft. Dissimilar computing channels are computing channels comparable to primary computing channels, but whose performance may be a little lower. They are therefore less costly to produce than primary computing channels. Each aircraft position primary computing channel is thus supplemented by a dissimilar computing channel, which allows the coherence of the primary aircraft position, the position computed by the primary computing channels, to be verified. Advantageously, mechanisms for verifying the reliability of the results of dissimilar computing channels are implemented to limit a loss of performance of the dissimilar computing channels with relation to the primary computing channels.

In one aspect, the disclosed embodiments relate to a method for monitoring the integrity of an aircraft position computed on board said aircraft, the computing of the aircraft position in particular bringing at least one first, one second and one third redundant primary computing channel into play, each computing, during a primary computing cycle, a primary aircraft position, characterized in that the method comprises:

- establishing, within the electronic control devices on-board in the aircraft, pairs of computing channels by associating, with each primary computing channel, a dissimilar computing channel computing, during a dissimilar computing cycle, a dissimilar position of the aircraft;
- computing, for each computing channel pair established, a distance between the primary position and the dissimilar position respectively computed by the primary computing channel and the dissimilar computing channel of the computing channel pair considered;
- comparing each distance computed to an alarm threshold;
- sending alarm information when at least one computed distance is greater than the alarm threshold.

Outside of the main characteristics that have just been mentioned in the previous paragraph, the method according to the disclosed embodiments may present one or more additional characteristics from among the following:

- alarm information is only sent when the computed distance is greater than the alarm threshold simultaneously for at least two pairs of established computing channels;
- alarm information is only sent when the computed distance is greater than the alarm threshold for several consecutive computing cycles;
- the number of consecutive cycles, presenting a computed distance greater than the alarm threshold, from which the alarm information is sent, is greater than one, for example is equal to three;
- the computed primary position is comprised of a first component and a second component, respectively corresponding to a horizontal component for the computed primary position and to a vertical component for the computed primary position, and in that the computed dissimilar position is comprised of a first component and a second component, respectively corresponding to a horizontal component for the computed dissimilar position and to a vertical component for the computed dissimilar position, the computed distances being computed on the one hand between horizontal components and on the other hand between vertical components;
- the alarm threshold comprises a horizontal reference at which the distances between horizontal components are compared, and a vertical reference at which the distances between vertical components are compared;
- the method also comprises for each computed distance and prior to the step of comparing the computed distance considered and the alarm threshold, modifying the value of the computed distance considered to make the value lower than the alarm threshold when the vertical component of the computed dissimilar position, reduced by a vertical integrity measurement value from the dissimilar position, is greater than the vertical component of the computed primary position;
- the method comprises the additional step of, for each computed distance and prior to the step of comparing each computed distance and the alarm threshold, modifying the value of the computed distance to make the value lower than the alarm threshold when the vertical component of the computed dissimilar position, reduced by a value of the vertical integrity measurement from the dissimilar position, is greater than a lower bound equal to the vertical component of the computed primary position reduced by a vertical integrity measurement value from the primary position;
- the method comprises the additional step of, prior to the step comparing each computed distance and the alarm threshold, modifying the value of a computed distance to make the value lower than the alarm threshold when a limit value, equal to the sum of a measurement of the horizontal integrity of the dissimilar position and a value of a distance between the horizontal component for the computed primary position and the horizontal component for the computed dissimilar position is less than a measurement of the horizontal integrity of the primary position;
- the computed primary position is a position hybridized with military GPS, and in that the dissimilar position is a position hybridized with civilian GPS;
- the dissimilar channels are redundant.

The disclosed embodiments will be detailed more precisely in the following description, given with reference to the accompanying figures.

BRIEF DESCRIPTION OF THE FIGURES

The figures are presented for indication purposes only and in no way limit the disclosed embodiments. The figures show.

DETAILED DESCRIPTION OF PREFERRED EMBODIMENTS

Different elements appearing in several figures will keep the same reference, unless otherwise stated.

Figure 1:
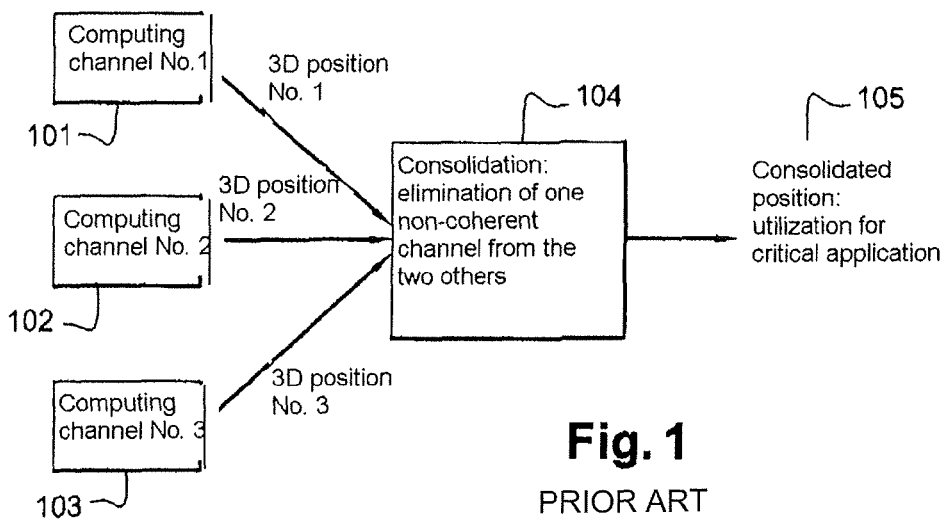
FIG. 1, already described, is a schematic representation of the organization of a computer from the prior art for computing an aircraft position.
Figure 2:
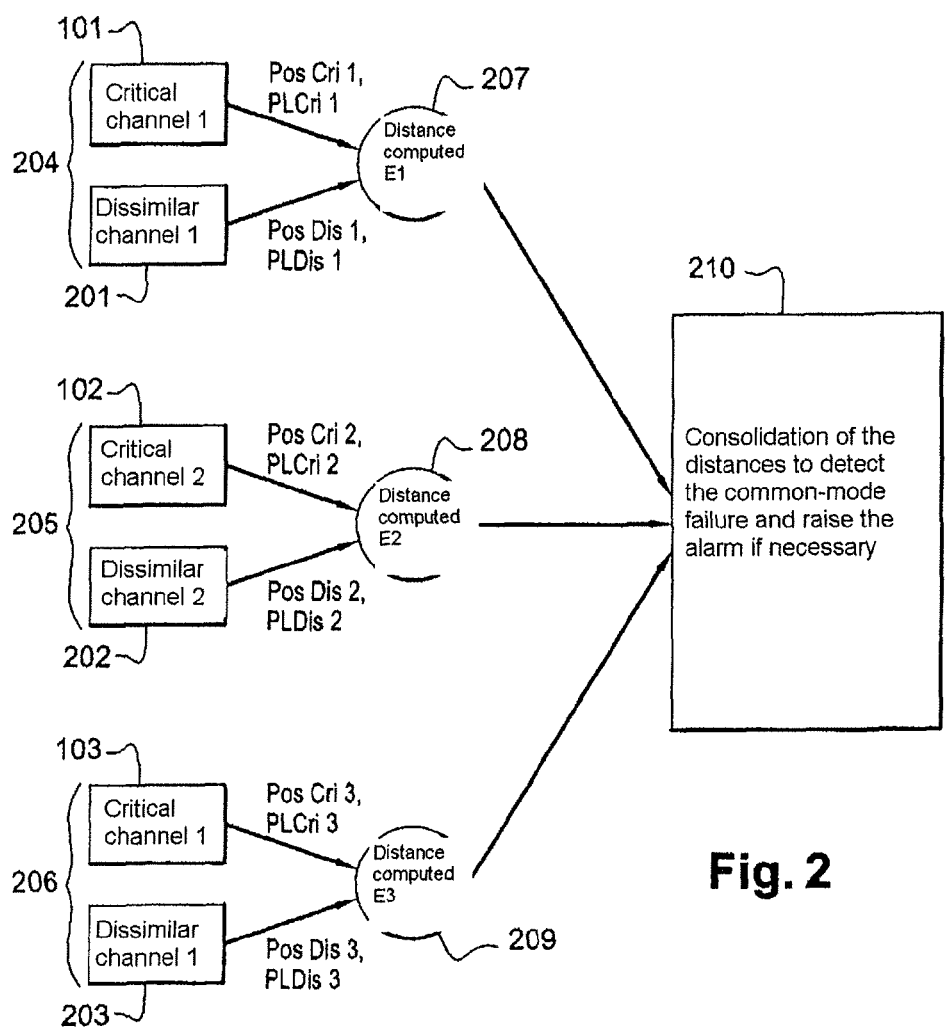
FIG. 2, is a schematic representation of the organization of a computer implementing an example of embodiment for computing an aircraft position.

FIG. 2 schematically shows an example of a functional organization of a computer able to implement the method according to the disclosed embodiments. In this example, the three primary, or critical, computing channels 101, 102 and 103 are found, which simultaneously produce, after a computing cycle known as the primary computing cycle, values respectively corresponding to a first primary position PosCri1, to a second primary position PosCri2, and to a third primary position PosCri3, associated with a primary position integrity measurement value, respectively referenced PLCri1, PLCri2 and PLCri3. Generally, the integrity measurements correspond to an estimate of the error of the value of the position to which it is associated, with a given degree of certainty. For example, a primary position integrity measurement value may be fifty meters, with a certainty of $10^{-7}$/fh. This means that a probability equal to $10^{-7}$ exists per hour of flight, as the real position of the aircraft is not within a radius of fifty meters from the position computed.

According to the disclosed embodiments, each of the primary computing channels is associated, in on-board electronic control devices in aircraft, with a dissimilar computing channel to form a pair of computing channels. Here, each primary computing channel 101, 102 and 103 is respectively associated with a dissimilar computing channel 201, 202 and 203, to form a pair of computing channels, respectively referenced 204, 205 and 206. Advantageously, the dissimilar computing channels are redundant.

The dissimilar computing channels simultaneously produce, after a computing cycle known as a dissimilar computing cycle, values respectively corresponding to a first dissimilar position PosDis1, to a second dissimilar position PosDis2, and to a third dissimilar position PosDis3, associated with a dissimilar position integrity measurement value, respectively referenced PLDis1, PLDis2 and PLDis3. In practice, the duration of primary and dissimilar computing cycles are similar. For example, these computing cycles last approximately 120 ms (milliseconds).

In the example illustrated, each pair of computing channels 204, 205 and 206 produces, after each computing cycle, a distance between the primary position and the dissimilar position computed, respectively referenced E1, E2 and E3, following the implementation of a comparison of different positions in the operations, respectively referenced 207, 208 and 209. An operation 210 for consolidating the distances then intervenes, in which distances E1, E2 and E3 are compared to an alarm threshold. When at least one of the alarm thresholds is greater than the threshold value, an alarm is raised, possibly under certain conditions, certain criteria, allowing the number of false alarms to be reduced. These conditions will be elaborated upon in the following text. The alarm consists of sending a signal informing the existence of a malfunction in the aircraft position determination. The alarm threshold value is determined according to the aircraft flight conditions, and with relation to an overall navigation error budget that is acceptable in the flight phase considered. In certain modes of implementation, it is considered that a large part of the overall error budget is disposed by integrating an error budget that is usually reserved for verifying the guiding of the aircraft.

In particular examples of implementation of the method according to the disclosed embodiments, each of the aircraft positions computed, which are primary aircraft positions or dissimilar aircraft positions, is characterized by a horizontal component which gives the horizontal position of the aircraft, the reference of the position in question then being supplemented by the letter H, and a vertical component, which gives the altitude of the aircraft, the reference of the position considered then being supplemented by the letter V. The same holds true for integrity measurement values, whose references are then preceded by the appropriate extension, that is, the letter H for the horizontal component of the integrity measurement, or the letter V for the vertical component of the integrity measurement.

In such examples of implementation, the alarm threshold is advantageously characterized by one horizontal reference and one vertical reference, whose values may be distinct. To determine if a distance between a primary position and a dissimilar position is greater than the alarm threshold, it then is advisable to compute the distances between each component of the computed positions, to obtain a vertical error component and a horizontal error component, and to compare this distance to the reference of the same type—horizontal or vertical—from the alarm threshold.

As referred to previously, in certain modes of implementation of the method according to the disclosed embodiments, one or more criteria from among the following are necessary for the alarm to be effectively raised:

A first criterion resides in the fact that it is necessary to simultaneously detect two distances greater than the alarm threshold to trigger the alarm. The distances taken into consideration here are, first, overall distances for a computing channel pair: the fact that the vertical and horizontal components of a given distance each exceed the associated alarm threshold reference then only counts as a single overpassing of the alarm threshold. In a second case, the distances taken into consideration are partial distances: either the vertical component or the horizontal component of a given distance exceeding the associated alarm threshold reference is sufficient for an alarm threshold overpassing to be accounted for in the overall distance considered.

A second criterion resides in the fact that it is necessary to observe, for a given pair of computing channels, several consecutive distances, overall or partial, to conclude that there was a malfunction and to validate an overpassing of the alarm threshold. Typically, if three consecutive distances, computed during three consecutive computing cycles, provided by the same computing channel pair, are greater than the alarm threshold, only then is the overpassing of the alarm threshold validated and taken into consideration for the possible triggering of the alarm.

A third criterion resides in the fact that, for a computing channel pair considered, and for the vertical components, the only obtained distances considered are those that reflect the fact that the aircraft risks, by taking the vertical integrity measurements of the dissimilar positions into consideration, being in a lower position than the primary position computed by the primary computing channel considered, the contrary case not being critical regarding ground collisions. Thus, if one considers that the vertical distance measured is equal to the expression PosCriV−(PosDisV−VPLDis), this expression must be positive. If this is not the case, it is concluded that the alarm threshold is not exceeded by the computed distance considered.

A fourth criterion resides in the fact that, for a computing channel pair considered, and for the vertical components, the only obtained distances considered are those that reflect the fact that the aircraft risks, by taking the vertical integrity measurements of the dissimilar positions into consideration, being in a lower position than that provided by the primary computing channels by taking the vertical integrity measurements of the primary positions into consideration; thus, if the following unequation (1)

$$PosDisV-VPLDis>PosCriV-VPLCri,$$

is verified, then the distance computed by the pair of computing channels considered is not taken into consideration. In practice, this distance is reduced by a computer in such a way as to no longer exceed the alarm threshold, for example, it is then established that the distance is zero. In fact, it is then in an instance where the alarm procedures are managed only by the primary computing channels. In the contrary case, the distance computed maintains its value and is compared to the vertical reference of the alarm threshold.

Figure 3:
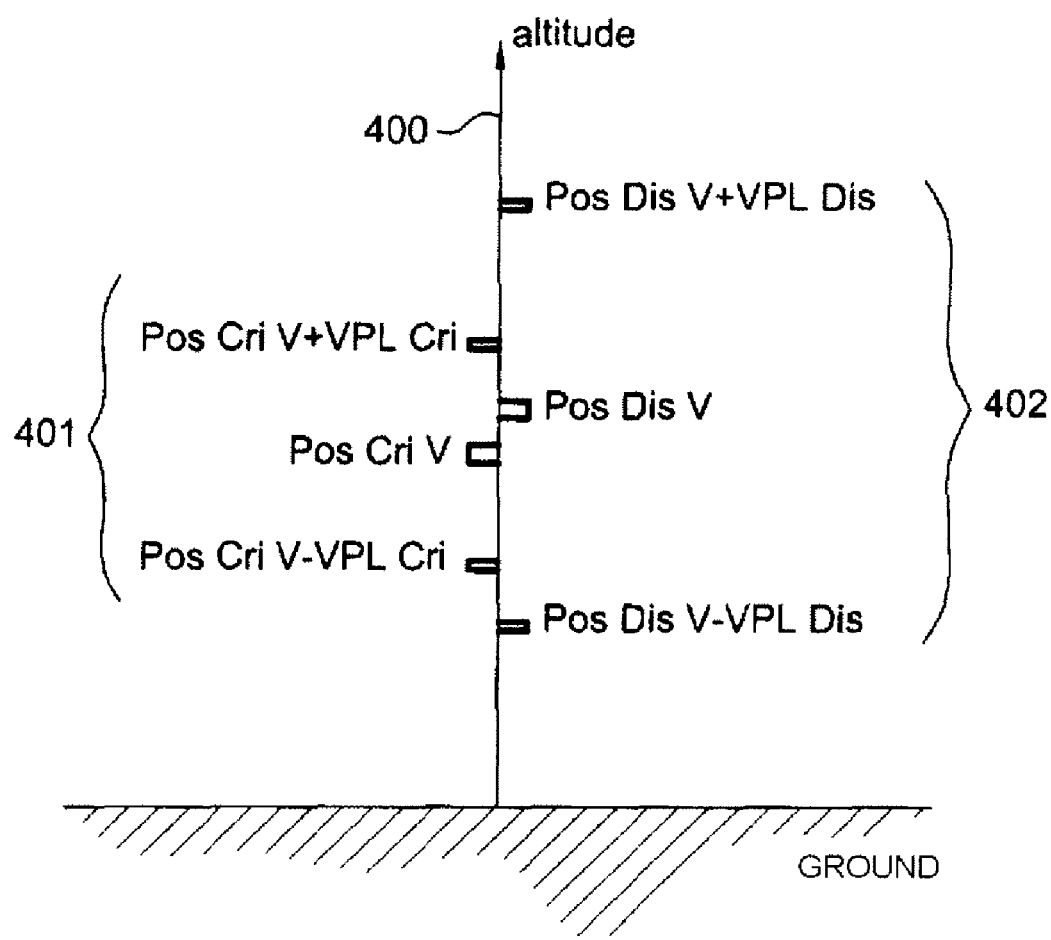
FIG. 3, is a schematic representation of a relative vertical positioning of various parameters intervening in an example of implementation of the method according to the disclosed embodiments for verifying a vertical component of the aircraft position.

FIG. 3 allows an instance where the measured positions fulfill the third and fourth conditions to be illustrated. In this example, a vertical axis 400 supports the different vertical components computed by a computing channel pair. A first segment 401 represents the amplitude of the protected zone, taken into consideration, by the primary computing channels, by considering the integrity measurement VPLCri. A second segment 402 represents the amplitude of the zone computed by the dissimilar computing channel, by considering the integrity measurement VPLDis. Here one sees that the PosDisV–VPLDis position is:

- on the one hand, lower than the PosCriV position, which corresponds to the third criterion;
- on the other hand, not contained in segment 401, which corresponds to the fourth criterion.

A fifth criterion resides in the fact that, for a computing channel pair considered, and for the horizontal components, the only obtained distances considered are those that reflect the fact that the aircraft risks, by taking the horizontal integrity measurements of the dissimilar positions into consideration, being in a position situated outside of a disk corresponding to the positions provided by the primary computing channels by taking the horizontal integrity measurements of the primary positions into consideration, thus, if the following unequation (2)

$$dist(PosCriH, PosDisH) + HPLDis < HPLCri,$$

where dist (PosCriH, PosDisH) is the distance between the primary position computed and the dissimilar position computed, is true, then the distance computed by the pair of computing channels considered is not taken into consideration. In practice, this distance is then reduced by a computer in such a way as to no longer exceed the alarm threshold, for example, it is then established that the distance is zero. In fact, here again, it is then in an instance where the alarm procedures are managed only by the primary computing channels. In the contrary case, the distance computed maintains its value and is compared to the horizontal reference of the alarm threshold.

The observation of one or more criteria from among the five criteria mentioned allows:

- on the one hand, to limit the performance losses of aircraft position computing due to a comparison with a less precise dissimilar means;
- on the other hand, to reduce the number of alerts that would be unnecessarily raised by the poor performance of the dissimilar computing channel.

In practice, the primary position may for example be the hybridized position obtained with a military GPS module; such a hybridized position takes information provided by the inertial navigation system of the aircraft and by the military GPS module, the module present in the aircraft inertial navigation system, into consideration. The dissimilar position may for example be the hybridized position obtained with a civilian GPS module; such a hybridized position takes information provided by the inertial navigation system of the aircraft and by the civilian GPS module, the module present in the aircraft, but not in its inertial navigation system, into consideration. The integrity measurements are protection limits for the computed positions; they are provided by an algorithm known as the position hybridization algorithm.

The invention claimed is:

1. A method for monitoring the integrity of an aircraft position channel on board said aircraft comprising:

using a plurality of redundant primary channels, each redundant primary channel computing, during a primary computing cycle, a primary position (PosCri) of the aircraft;

establishing, within the electronic control devices on-board in the aircraft, pairs of computing channels by associating, with each primary computing channel, a dissimilar computing channel, each dissimilar computing channel computing, during a dissimilar computing cycle, a dissimilar position (PosDis) of the aircraft;

computing, for each computing channel pair established, a distance (E1; E2; E3) between the primary position and the dissimilar position respectively computed by the primary computing channel and the dissimilar computing channel of the computing channel pair considered;

comparing each distance computed to an alarm threshold;

sending alarm information when at least one computed distance is greater than the alarm threshold.

2. The method according to claim 1, wherein said plurality of redundant primary channels corresponds to at least one first, one second and one third redundant channel.

3. The method according to claim 1, wherein alarm information is only sent when the computed distance is greater than the alarm threshold for at least two pairs of established computing channels simultaneously.

4. The method according to claim 1, wherein alarm information is only sent when the computed distance is greater than the alarm threshold for several consecutive computing cycles.

5. The method according to claim 1, wherein the number of consecutive cycles, presenting a computed distance greater than the alarm threshold, from which the alarm information is sent, is equal to three.

6. The method according to claim 1, wherein the computed primary position is comprised of a first component and a second component, respectively corresponding to a horizontal component (PosCriH) for the computed primary position and to a vertical component (PosCriV) for the computed primary position, and in that the computed dissimilar position is comprised of a first component and a second component, respectively corresponding to a horizontal component (PosDisH) for the computed dissimilar position and to a vertical component (PosDisV) for the computed dissimilar position, the computed distances being computed on the one hand between horizontal components and on the other hand between vertical components.

7. The method according to claim 6, wherein the method further comprises for each computed distance and prior to the step of comparing the computed distance considered and the alarm threshold, modifying the value of the computed distance considered to make the value lower than the alarm threshold when the vertical component of the computed dissimilar position, reduced by a value of the vertical integrity measurement for the dissimilar position (VPLDis), is greater than the vertical component of the computed primary position.

8. The method according to claim 6, wherein the method further comprises, for each computed distance and prior to the step of comparing each computed distance and the alarm threshold, modifying the value of the computed distance to make the value lower than the alarm threshold when the vertical component of the computed dissimilar position, reduced by a value of the vertical integrity measurement for the dissimilar position (VPLDis), is greater than a lower bound equal to the vertical component of the computed primary position reduced by a value of the vertical integrity measurement for the primary position (VPLCri).

9. The method according to claim 6, wherein the method further comprises, prior to the step comparing each computed distance and the alarm threshold, modifying the value of a computed distance to make the value lower than the alarm threshold when a limit value, equal to the sum of a measurement of the horizontal integrity of the dissimilar position and a value of a distance between the horizontal component of the computed primary position and the horizontal component of the computed dissimilar position, is less than a measurement of the horizontal integrity of the primary position.

10. The method according to claim 1, wherein the alarm threshold comprises a horizontal reference to which the distances between horizontal components are compared, and a vertical reference to which the distances between vertical components are compared.

11. The method according to claim 1, wherein the primary computed position is a position hybridized with military GPS, and in that the dissimilar position is a position hybridized with civilian GPS.

12. The method according to claim 1, wherein the dissimilar channels are redundant.

13. An aircraft comprising a device implementing the method according to claim 1.

14. A device for computing a position of an aircraft integrated with said aircraft, comprising:
- a multiplicity of redundant primary computing channels, able to compute, during a primary computing cycle, a primary aircraft position (PosCri);
- a multiplicity of dissimilar computing channels associated with each primary computing channel in such a way as to form pairs of computing channels, each dissimilar computing channel being able to compute, during a dissimilar computing cycle, a dissimilar position (PosDis) of the aircraft;
- a computer configured to compute, for each computing channel pair established, a distance (E1; E2; E3) between the primary position and the dissimilar position respectively computed by the primary computing channel and the dissimilar computing channel of the computing channel pair considered;
- wherein the computer is further configured to compare each distance computed to an alarm threshold; and
- the computer is still further configured to send alarm information when at least one computed distance is greater than the alarm threshold.

15. The device according to claim 14, wherein the device comprises at least one first, one second and one third primary computing redundant channels and at least one first, one second and one third dissimilar computing channels respectively associated with the first, second and third primary computing channels in such a way as to respectively form at least one first, one second and one third computing channel pairs.

16. An aircraft comprising a position computing device according to claim 14.

* * * * *